United States Patent [19]

Gorrell et al.

[11] 4,090,415

[45] May 23, 1978

[54] VARIABLE-SPEED PLANETARY TRANSMISSION

[75] Inventors: James M. Gorrell, Morton; Terry R. Collins, Lewistown; Willis E. Windish, Pekin, all of Ill.

[73] Assignee: Caterpillar Tractor Co., Peoria, Ill.

[21] Appl. No.: 702,547

[22] Filed: Jul. 6, 1976

[51] Int. Cl.² .............................................. B60K 41/18
[52] U.S. Cl. ........................................ 74/769; 74/753; 74/759
[58] Field of Search .................. 74/768, 769, 753, 759

[56] References Cited

U.S. PATENT DOCUMENTS

| | | | |
|---|---|---|---|
| 3,347,113 | 10/1967 | Ramsel | 74/769 X |
| 3,610,071 | 10/1971 | Tuck | 74/759 |
| 3,817,124 | 6/1974 | Mori et al. | 74/759 |
| 3,946,624 | 3/1976 | Murakami et al. | 74/769 |

*Primary Examiner*—Samuel Scott
*Assistant Examiner*—Lance W. Chandler
*Attorney, Agent, or Firm*—Phillips, Moore, Weissenberger, Lempio & Majestic

[57] ABSTRACT

In a dual transmission system, the front transmission has a three-speed gearbox with a low, intermediate and a 1:1 input-to-output speed ratio coupled to a three-speed range unit to provide seven usable forward speeds. A converter lock-up clutch is used to provide direct mechanical drive in the upper six gears. The rear transmission has an identical three-speed range unit. An additional gear train is added to the rear transmission to provide four speeds. The additional very low speed is used in conjunction with the lowest speed of the front seven-speed transmission. Both transmissions are operated in torque converter drive in first gear only. When any of the speed ranges of the front range unit is used in conjunction with the low or intermediate input-to-output speed ratio of the front gearbox the same speed range of the rear transmission is coupled by a torque converter to the rear engine. When any of the speed ranges of the front range unit is used in conjunction with the 1:1 speed ratio of the front gearbox, the same speed range of the rear range unit is coupled directly and mechanically to the rear engine.

28 Claims, 7 Drawing Figures

VARIABLE-SPEED PLANETARY TRANSMISSION

BACKGROUND OF THE INVENTION

This invention relates to vehicle drive systems and more particularly to systems in a vehicle having more than one engine and requiring a coordination of the separate transmissions of the vehicle.

To provide increased traction and load-carrying capacity, certain vehicles are provided with more than one engine in an arrangement wherein each engine drives a separate set of wheels, tracks or other ground-engaging members through separate transmissions. An example of such a vehicle is a tractor-drawn scraper wherein one engine and its transmission is mounted on the tractor unit for delivering power to the tractor wheels and wherein a second engine and its transmission are mounted on the scraper unit to deliver power to the scraper wheels.

During the loading phase, which occurs at vehicle speed between two and four miles per hour, it is essential to provide sufficient torque to the tractor and scraper wheels over this range of speeds which does not require shifting of the transmission in the event the scraper encounters varying resistances. Typically this is accomplished by coupling the two engines to their respective wheels by means of torque converters when the transmissions are in their lowest range.

At the higher vehicle speeds at which the loaded scraper is run when transporting earth, the transmissions are conditioned for straight mechanical drive, and the speed ranges available in the various gears are so selected that a minimum horsepower gap is produced between steps. Accordingly, the output horsepower of the system is more uniform throughout the various high speed ranges.

A typical tractor engine will utilize a transmission having seven or so forward gear ranges, as well as a reverse gear range.

It is important that the tractor wheels and scraper wheels be driven at as nearly the same speed as possible throughout the range of operation. If this is not done, then the difference in speed of the two sets of wheels will cause one set to slip relative to the other and thereby cause undue tire wear.

Typically, the problem of wheel slippage is met by providing a transmission for the scraper unit which is identical to that for the tractor unit, the two transmissions having the same number of gear ranges. The two transmissions are then simultaneously shifted through ranges so that the speeds of the two sets of wheels are varied in unison. Although such use of identical transmissions does provide for speed matching, this increases the cost of the vehicle since such transmissions are quite complex and corresponding expensive to build and install. Examples of planetary gear transmissions used in earth moving machines are shown in U.S. Pat. Nos. 3,381,546 and 3,347,113.

It is a main object of the present invention to provide a transmission system for a dual engine-powered vehicle wherein one of the transmissions has a considerably lesser number of gear ranges than the other but wherein the two transmissions provide proper speed matching throughout the range of operation of the vehicle.

In order to further reduce costs, it is another main object of the invention to provide such a transmission system wherein a substantial portion of the transmission with the smaller number of gear ranges is identical to a portion of the other transmission.

SUMMARY OF THE INVENTION

The main objects are met by providing a transmission for one end of the vehicle which has a bypassable torque converter unit, a three-speed front gearbox and three-speed-forward and one-speed-reverse range unit arranged to provide a seven-speed-forward and one-speed-reverse drive. In the lowest speed forward, the lowest gear of the range unit is used in conjunction with the lowest gear of the front gearbox. Second and third speeds then use the lowest gear of the range unit conjunction with first the intermediate and then the highest gear of the front gearbox. Third and fourth speeds use the intermediate gear of the range unit in conjunction with first the intermediate and then the highest gear of the front gearbox. Sixth and seventh speeds again use the intermediate and then the highest gear of the front gearbox but in conjunction with the highest gear of the range unit. The torque converter is used throughout the lowest speed and part of the second speed, and direct mechanical drive is used for the rest of the speed range.

The transmission for the other end of the vehicle has a bypassable torque converter and an identical three-speed-forward and one-speed-reverse range unit, and an additional very low gear, thus providing a four-speed forward and one-speed reverse.

Speed matching is accomplished by operating the second transmission in its very low gear and with torque converter drive when the first transmission is in its lowest speed. Thereafter, corresponding range unit gears of each transmission are used at the same time. Torque converter drive is then used in the second transmission whenever the first transmission is using the intermediate gear of its front gearbox. Wheel slippage is prevented from occurring at such time because the speed mismatch is accommodated by converter slippage. Direct mechanical drive is used in the second transmission whenever the first transmission is delivering power through the highest gear of its front gearbox. The rear transmission is usable in torque converter drive only for all speed matching, never requiring direct mechanical drive.

Other objects and advantages will become apparent in the course of the following detailed description.

BRIEF DESCRIPTION OF THE DRAWINGS

In the drawings, forming a part of this application, and in which like parts are designated by like reference numerals throughout the same.

DESCRIPTION OF THE PREFERRED EMBODIMENT

Figure 1:
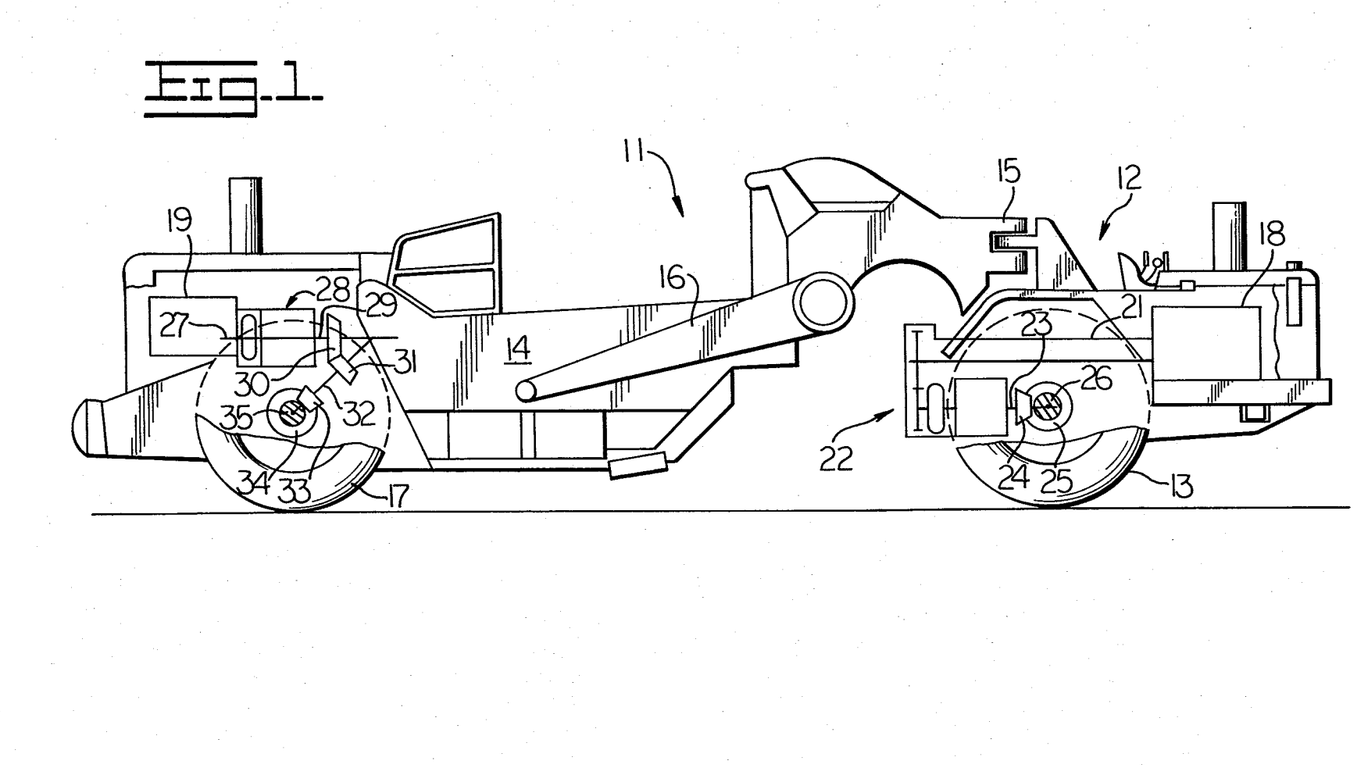
FIG. 1 is a side-elevational view of a dual-engine vehicle having separate transmissions for each engine.

Referring now to the drawings, wherein are shown preferred embodiments of the invention, FIG. 1 shows the invention applied to an earthmoving scraper 11 of the form having a tractor 12 riding on front wheels 13 and coupled to a scraper bowl 14 through an articulation 15 and draft arms 16 wherein the scraper bowl rides on rear wheels 17, and detailed construction of such a scraper being well known to the art. In order to provide maximum traction and load-carrying capacity such a scraper 11 has a front engine 18 driving the tractor wheels 13 and a rear engine 19 drawing the scraper wheels 17. More particularly, the input torque of front engine 18 is transmitted by drive shaft 21 to the front transmission 22. The output shaft 23 from the transmission supplies power to the front wheels 13 through bevel gears 24 and 25 mounted on the output shaft 23 and front axle 26 respectively. The input torque of rear engine 19 is transmitted by drive shaft 27 to the rear transmission 28, the output shaft 29 of which is connected through bevel gears 30 and 31 to shaft 32 and through bevel gears 33 and 34 to the rear axle 35. In practice it is generally preferable that the front engine have greater power than the rear engine. For example, in a scraper as shown in FIG. 1, the tractor may have a 415 horsepower engine while the scraper may have a 225 horsepower engine. It should be understood that the invention herein described as applied to a scraper 11 is not limited to use in such a vehicle but may be used in other dual-engine vehicles including vehicles which may employ tracks or other running gear as ground-engaging members.

Figure 2:
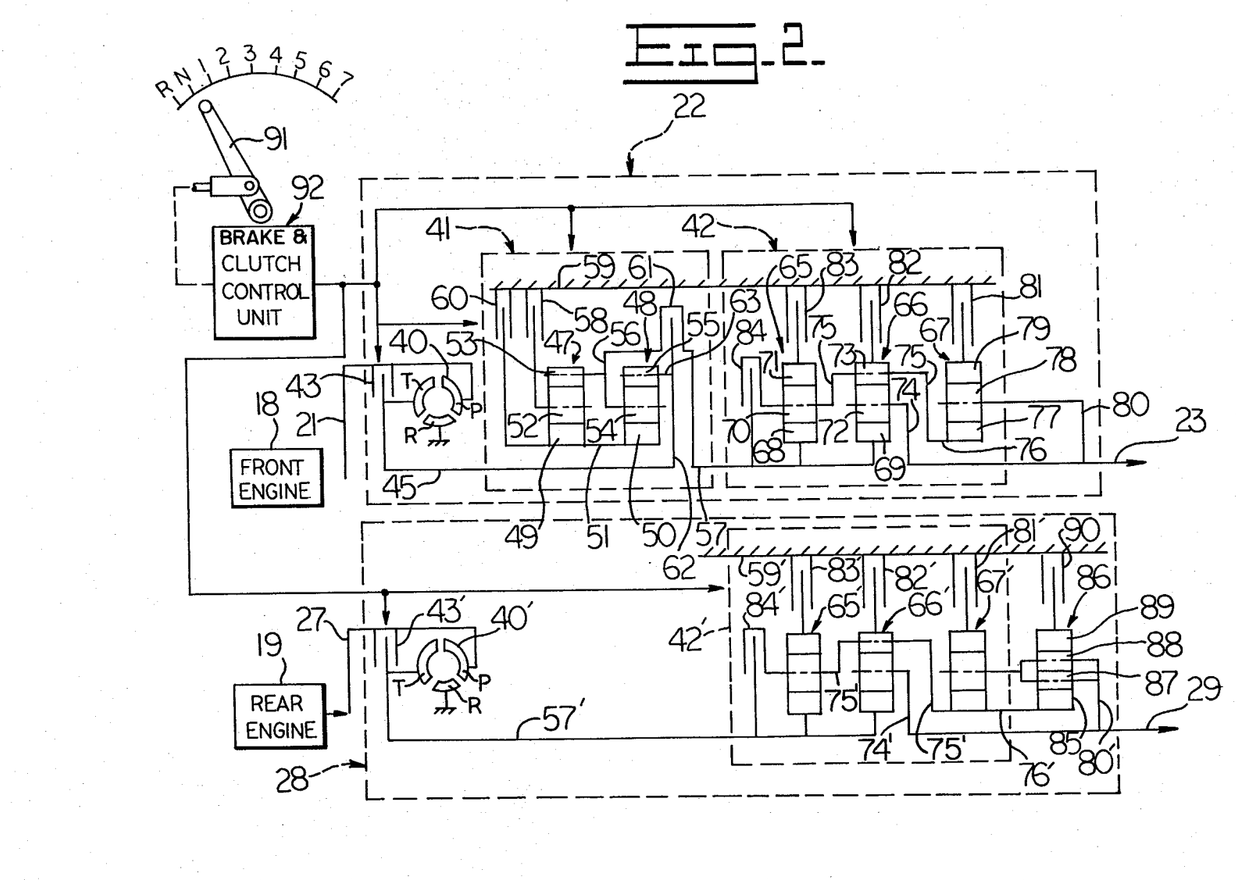
FIG. 2 is a schematic diagram off the transmissions for each engine of the vehicle of FIG. 1.

Referring now to FIG. 2, front transmission 22 includes a conventional hydrodynamic torque converter 40, a front gearbox 41 and a range unit 42. In general, the torque converter 40 has a pump P connected to drive shaft 21 for rotation thereby, a turbine T connected to shaft 45 and fixed reactor blades R. A pickup clutch 43 is provided for clutching the pump and turbine of torque converter 40 together to enable drive shaft 21 to be connected directly to shaft 45 when it is desired to bypass the torque converter and provide a direct mechanical drive from the engine to shaft 45.

The front gearbox 41 includes two planetary sets 47 and 48 having their sun gears 49 and 50 each fixed to shaft 51, the latter being coaxial to and rotatable relative to shaft 45. Planet gear 52 of set 47 is in meshing engagement with sun gear 49 and ring gear 53, while planet gear 54 of planet set 48 is in mesh with sun gear 50 and ring gear 55. Ring gear 53 and planet gear 54 are mounted on a common carrier 56 which is fixed to output shaft 57. Brake 58 enables the axis of planet gear 52 to be fixed relative to the transmission housing 59, while brake 60 enables the shaft 51 to be held against rotation relative to the housing. Clutch 61 enables shaft 45 to be coupled to carrier 56 through disc 62 splined to shaft 45. Disc 62 drives ring gear 55 by connection 63 thereto.

The front gearbox 41 provides three speed ratios of torque transmission from the input 45 to the output 57 thereof. The greatest step-down ratio is achieved by energizing brake 58 to prevent movement of the axis of planet gear 52 of planetary set 47. As shaft 45 is rotated, it will drive ring gear 55 and cause planet gear 54 to be driven thereby. Carrier 56 is coupled to the output shaft 23 of transmission 22 and thus the rotation of planet gear 54 will cause sun gears 50 and 49 to be driven. Since planet gear 52 is held by brake 58, the drive of sun gear 49 will be transmitted through planet gear 52 to ring gear 53 to cause carrier 56 and shaft 57 to be driven.

An intermediate speed ratio is brought about by engaging brake 60 to hold shaft 51 and sun gear 50 against rotation. Rotation of shaft 45 and disc 62 thereon will drive ring gear 55 and cause planet gear 54 to revolve around sun gear 50, and thereby cause carrier 56 and output shaft 57 to be driven thereby.

Direct coupling is obtained by engaging clutch 61 to couple disc 62 directly to carrier 56 and thereby cause a one-to-one drive from shaft 45 to shaft 57.

The range unit 42 also provides three speed ratios for three-speed-forward torque transmission from shaft 57 to output shaft 23 as well as a reverse speed. The range unit 42 includes three planetary sets 65, 66, 67. Sun gears 68 and 69 of planetary sets 65 and 66 are mounted on shaft 57 for rotation therewith. Planet gear 70 of set 65 is in mesh with sun gear 68 and ring gear 71, while planet gear 72 of set 66 is in mesh with sun gear 69 and ring gear 73. Planet gear 72 is mounted on carrier 74 splined to output shaft 23. Planet gear 70 and ring gear 73 are mounted on a common carrier 75 which includes shaft 76, as an integral part thereof, shaft 76 being coaxial with and rotatable relative to output shaft 23. Sun gear 77 of planetary set 67 is fixed to shaft 76, and planet gear 78 is in mesh with sun gear 77 and ring gear 79. Planet gear 78 is mounted on carrier 80 splined to output shaft 23. Exemplary gear ratios of the planetary sets may be selectively held against rotation by means of brakes 81, 82 and 83. Clutch 84 is provided to couple carrier 75 to input shaft 57.

The greatest ratio of input-to-output speed range unit 42 is brought about by engaging brake 82 to hold ring gear 73 against movement. Rotation of shaft 57 and sun gear 69 will then cause planet gear 72 to revolve around ring gear 73 and cause carrier 74 and output shaft 23 to move therewith.

Engagement of brake 83 will enable torque to be transmitted through range unit 42 and an intermediate speed ratio by holding ring gear 71 against movement. Rotation of shaft 57 and sun gear 68 will then cause planet gear 70 to revolve around ring gear 73 to move therewith. Output torque is delivered through sun gear 69 and planet gear 72 to carrier 74 and thus output shaft 23.

Engagement of brake 84 couples carrier 75 to shaft 57 and thereby also couples ring gear 73 of set 66 to shaft 57. As a consequence, planet gear 72 is held against movement relative to the sun and ring gears 69 and 73 and carrier 74 and output shaft 23 will be coupled directly to shaft 57 to provide a direct one-to-one forward drive from shaft 57 to output shaft 23.

Reverse speed is provided by actuation of brake 81, which holds ring gear 79 of planetary set 67 against movement. Since planet gear 72 is revolving around sun gear 69 at a speed determined by rotation of output shaft 23 (coupled to the front wheels of the vehicle) rotation of sun gear 69 will cause ring gear 73 to be driven, so that carrier 75, will cause sun gear 77 to be driven since gears 73 and 77 are both coupled to carrier 75. With ring gear 79 now held, rotation of sun gear 77 will drive planet gear 78 around the ring gear 77, such movement being coupled by carrier 80 to output shaft 23 to cause is to rotate in a direction opposite to the rotation of shaft 57.

The rear transmission 28 utilizes many of the same components as used in front transmission 22 and thus considerably decreases the cost that would be involved in manufacture of such parts. The parts of the rear transmission which correspond to parts of the front transmission are identified by primed reference numerals. The drive shaft 28 of rear engine 19 is connected to pump P of torque converter 40', and its turbine T is connected to transmission shaft 57'. Pickup clutch 43' enables the drive shaft 27 to be coupled directly to shaft 57' to bypass the torque converter 40' and provide direct mechanical drive to shaft 57'.

Shaft 57' transmits torque to range unit 42', identical to range unit 42 with the exception that shaft 76' of carrier 75' is lengthened to accommodate placement of sun gear 85 of planetary set 86 thereon. Double planet gears 87 and 88 are in mesh with each other and with sun gear 85 and ring gear 89 respectively. Planet carrier 80', splined to output shaft 29, is also modified to carry planet gears 87 and 88 therewith as well as the planet gear of planetary set 67'.

Actuation of brakes 82', 83' and 84' will couple shaft 57' to output shaft 29 in the same way as previously described in connection with range unit 42, and the gear ratios will be the same for each of the three forward speeds available from such rotation of output shaft 29 at the same gear ratio.

A low, low output speed range is available by actuation of brake 90 which prevents movement of the ring gear of planetary set 86 relative to the housing 59'. As previously described in connection with reverse speed, shaft 76' will be rotating relative to shaft 57' at a speed dependent upon the relative rates of rotation of shaft 57' and the output shaft 29. With ring gear 89 held against movement, sun gear 85, rotating with shaft 76', will drive planet gears 87 and 88 and carrier 80' to drive output shaft 29 at a very low speed relative to the speed of rotation of input shaft 57'. Double planet gears 87 and 88 are used so that the direction of rotation of output shaft 29 is the same as that of shaft 57'.

The speed ranges of the vehicle may be controlled by the vehicle operator by means of lever 91 which may be moved to reverse, neutral and the seven forward speed positions. The position of the lever 91 is transmitted to clutch and brake control unit 92 which is connected to the various clutches and brakes of the front and rear transmissions for actuation thereof as described below. Control unit 92 may be of the type illustrated in U.S. Pat. Nos. 3,386,540 and 3,452,621, suitably modified to provide for coordinated clutch and brake control as described below.

OPERATION

Figure 3:
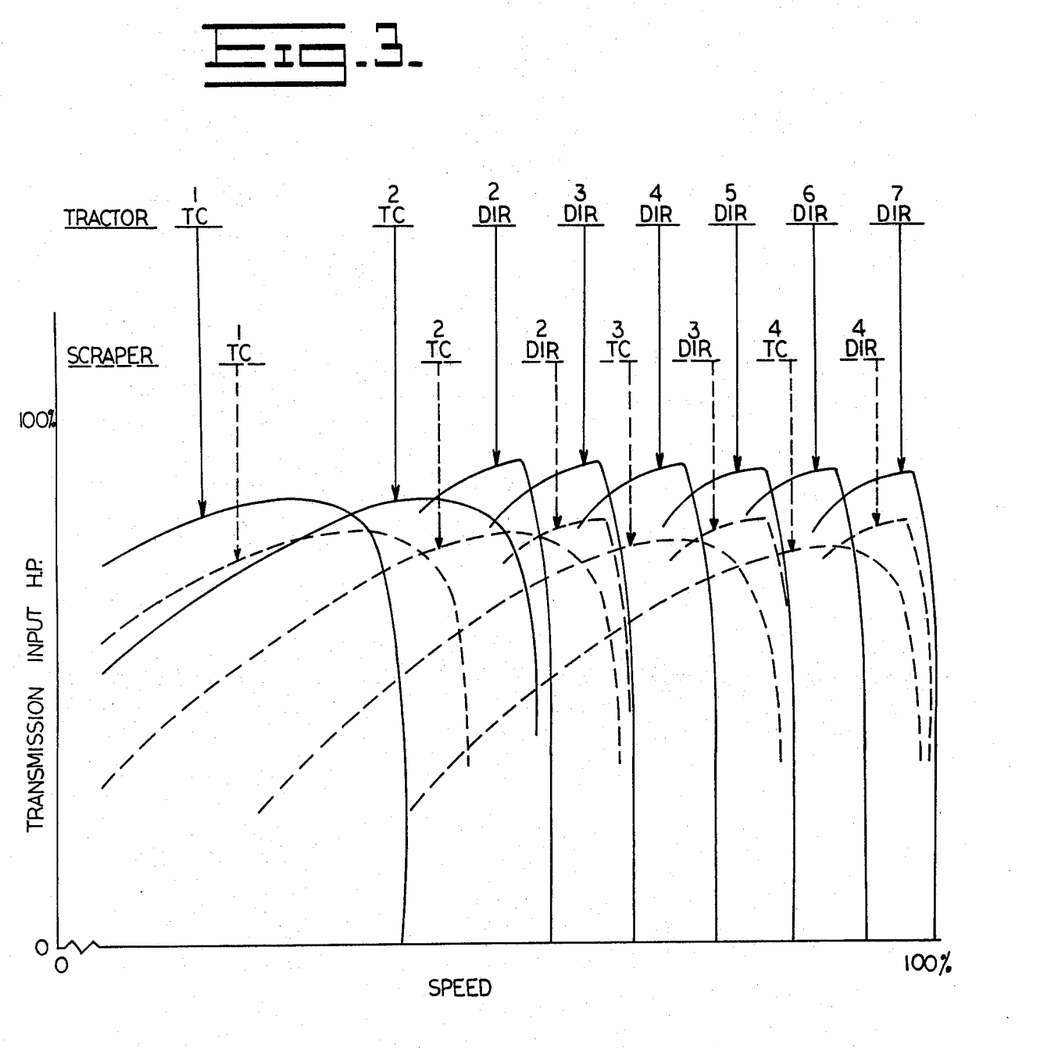
FIG. 3 is graphical representation showing the characteristics of the transmissions wherein the percentage of power developed is plotted against percentage of vehicle speed.

The sequential operation of the transmissions and the speed matching thereof may best be explained by reference to FIGS. 3 and 4. FIG. 3 shown, in unbroken lines, the speed plotted against transmission input horsepower for each of the seven forward speed ranges one through seven of the tractor unit. The reference letters "TC" and "DIR" in connection with the speed ranges indicate whether the tractor unit transmission 22 is operating in torque converter or direct drive. The broken lines show the speed plotted against transmission input horsepower for each of the four speed ranges of the scraper unit transmission 28 as they operate in conjunction with the torque converter 40' or directly from the engine shaft 27.

Figure 4:
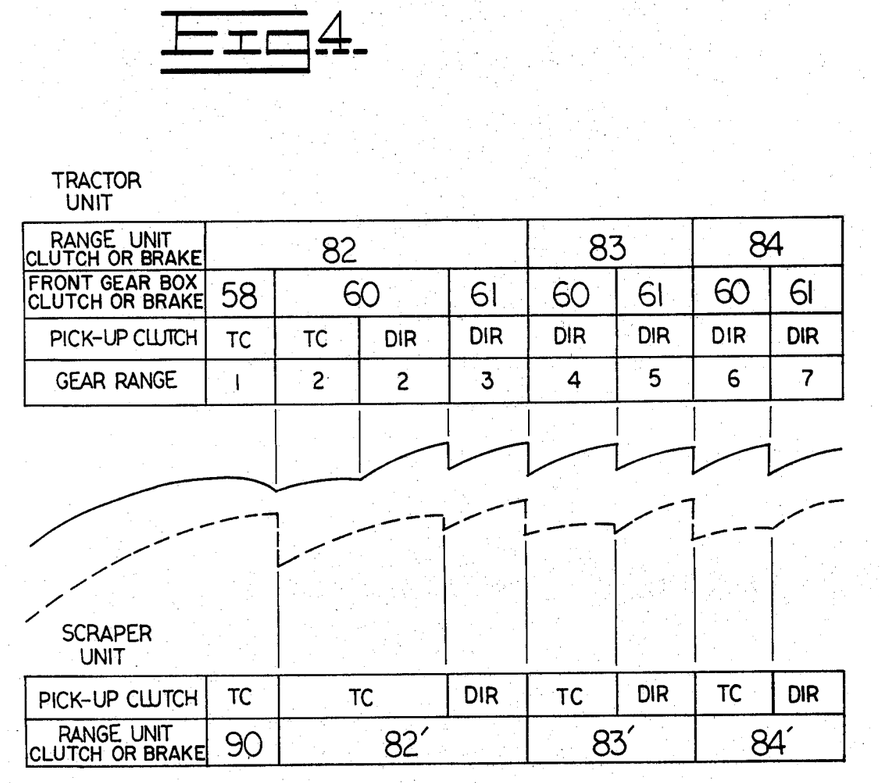
FIG. 4 is a graphical representation of the envelope of the curves of FIG. 3, and showing the coordination of the transmission clutches for the various speed ranges of the vehicle.

FIG. 4 shows the envelopes of the unbroken and broken line curves of FIG. 3 together with the various clutches and brakes of the two transmissions that are energized during any one of the seven forward speeds of the tractor unit.

With the vehicle at rest, with both tractor and scraper engines operating, and with the control lever in neutral, the clutch and brake control unit 92 will cause clutch 84 of the front range unit to be engaged. No power will be delivered at this time to the tractor or scraper wheels.

To operate the vehicle in loading, the operator will shift the control lever to "1" position. In response thereto, clutch and brake control unit 92 will cause brakes 58 and 82 of the front transmission and brake 90 of the rear transmission to be energized. As previously described, this will cause both tractor and scraper units to operate at their lowest speed. Both transmissions will be operating at this range in conjunction with the torque converters 40 and 40'.

To increase the speed of the vehicle, the operator shifts the control lever to position "2". Clutch and brake control unit 92 releases clutch 58 and energizes brake 60 of the front transmission. Additionally, the control unit 92 also releases brake 90 and energizes brake 82' of the rear transmission. At this time, corresponding gears of the two range units will be used, since the corresponding brakes 82 and 82' will be engaged. The front range unit 42 will be operating in conjunction with the intermediate range of the front gearbox (and also the torque converter 40) and the rear range unit 42' will be operating in conjunction with torque converter 40'.

As the speed of the vehicle increases, a conventional speed sensor in the clutch and brake control unit will cause an autometic engagement of pick-up clutch 43 when a predetermined speed has been reached. This will now cause the front gearbox to be directly and mechanically driven by the front engine shaft 21. As long as the vehicle speed remains above this predetermined speed, pick up clutch 43 will remain energized. Pick up clutch 43' of the scraper transmission remains disengaged, however, at all times while the vehicle is in its second forward speed.

During the time that the tractor unit is operating in the second speed forward, first in torque converter drive and then in direct drive, there will be some mismatch in speed between the tractor and scraper units, but this mismatch will be compensated for by slippage in the rear torque converter 40' because the scraper unit is operating in torque converter drive during such time.

When the operator shifts the control lever to position "3", clutch 82 remains engaged and brake 61 becomes engaged so that the range unit input shaft 57 is directly driven, at a 1:1 ratio, by the tractor engine shaft 21.

At the same time that the clutch and brake control unit causes clutch 61 to be engaged, it will also cause pick up clutch 43' to be engaged so that the range unit input shaft 57' is also directly driven, at a 1:1 ratio, by the scraper engine shaft 27. Since the gear ratios of range units 42 and 42' are identical and corresponding brakes 82 and 82' are engaged, the gear ratios and speeds are matched in the third forward speed of the vehicle.

Movement of the control lever 91 to position "4" causes brakes 83 and 83' of the two range units to be engaged. Brake 60 is again energized so that the front range unit operates in direct drive and in conjunction with the intermediate range of the front gearbox. Pick up clutch 43', which only engages when clutch 61 is engaged, is disengaged so that the rear range unit 42' operates in conjunction with torque converter 40' to compensate for speed mismatch during the time that the front range unit is operating in conjunction with the intermediate range of the front gearbox.

As the control lever is shifted to position "5", clutch 61 and pick up clutch 43' are again engaged. Again, since corresponding gear sets of range units 42 and 42' are engaged by corresponding brakes 83 and 83', and are driven directly at 1:1 ratios by the engine shafts, the gear ratios and speeds will be matched in the fifth forward speed of the vehicle.

Shifting of the control lever to position "6" or "7" will engage clutches 84 and 84' of the front and rear range units so that there is a 1:1 transmission of power therethrough. In position "6" the front range unit is directly driven through the intermediate range of the front gearbox while the rear range unit is driven through torque converter 40'. In position "7" both range units are directly driven at 1:1 ratios by the respective engine shafts 21 and 27.

The operator may, when the occasion demands, shift the control lever to reverse position. The clutch and brake control unit will simultaneously engage clutch 61 and brake 81 of the front transmission and brake 81' of the rear transmission. This will couple the input shafts 57 and 57' of the range units to the torque converters 40 and 40' for a 1:1 drive thereby and the reverse speeds at the output shafts 23 and 29 will be matched.

Figure 5:
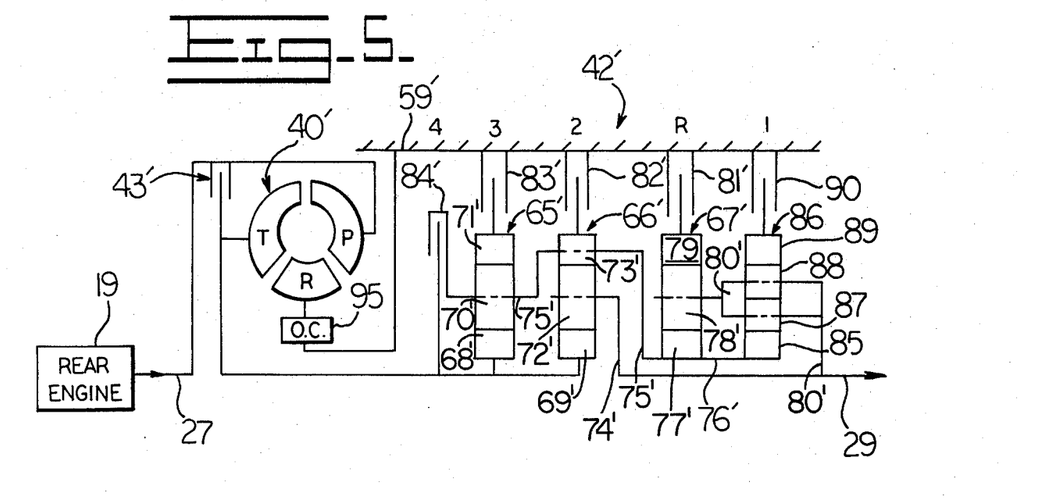
FIGS. 5 and 6 are schematic diagrams of modifications of the rear engine and transmission portion of FIG. 2.

FIG. 5 illustrates a modification of the rear transmission 42' of FIG. 2. In the modification of FIG. 5 the reactor blades R of the torque converter 40' are connected to the stationary housing 59' through a conventional overrunning clutch 95 instead of being directly fixed to the housing 59', as illustrated in FIG. 2. The overrunning clutch permits free wheeling movement of the reactor blades R at the higher converter speed ratio of operation so that the converter operates as a fluid coupling, and thereby increases the efficiency of torque transmission during the periods of operation when the torque converter is used in conjunction with the rear range unit 42', i.e., when the front transmission is operating in second, fourth and sixth forward speeds.

Figure 6:
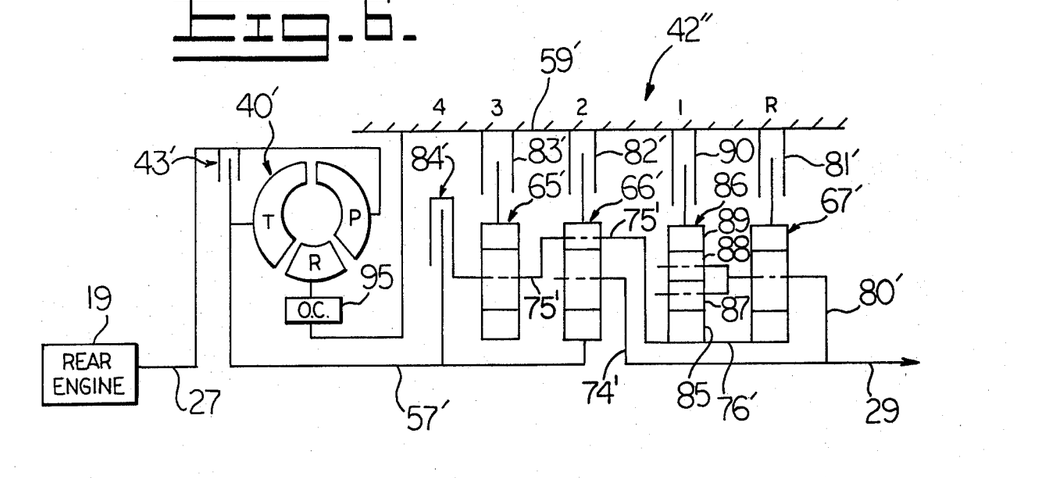

FIG. 6 illustrates yet another modification of the rear transmission 42' of FIG. 2, such modification being also used with the front transmission of FIG. 2. In FIG. 6, as in FIG. 5, the reactor blades R of the torque converter 40' are connected to the housing 59' through an overrunning clutch 95. The range unit 42" of FIG. 6 differs from range unit 42' of FIGS. 2 and 5 in that the positions of planetary sets 67' and 86 therein have been reversed. However, the sun gears of both sets are still coupled to carrier 75' and the planet gears of both are carried on the common carrier 80'. The locations of brakes 81' and 90 have also been reversed. Otherwise, operation of the rear transmission of FIG. 6 in response to actuation of the clutches and brakes thereof and operation of such rear transmission in conjunction with tthe front transmission is the same as previously described in connection with FIG. 2.

Figure 7:
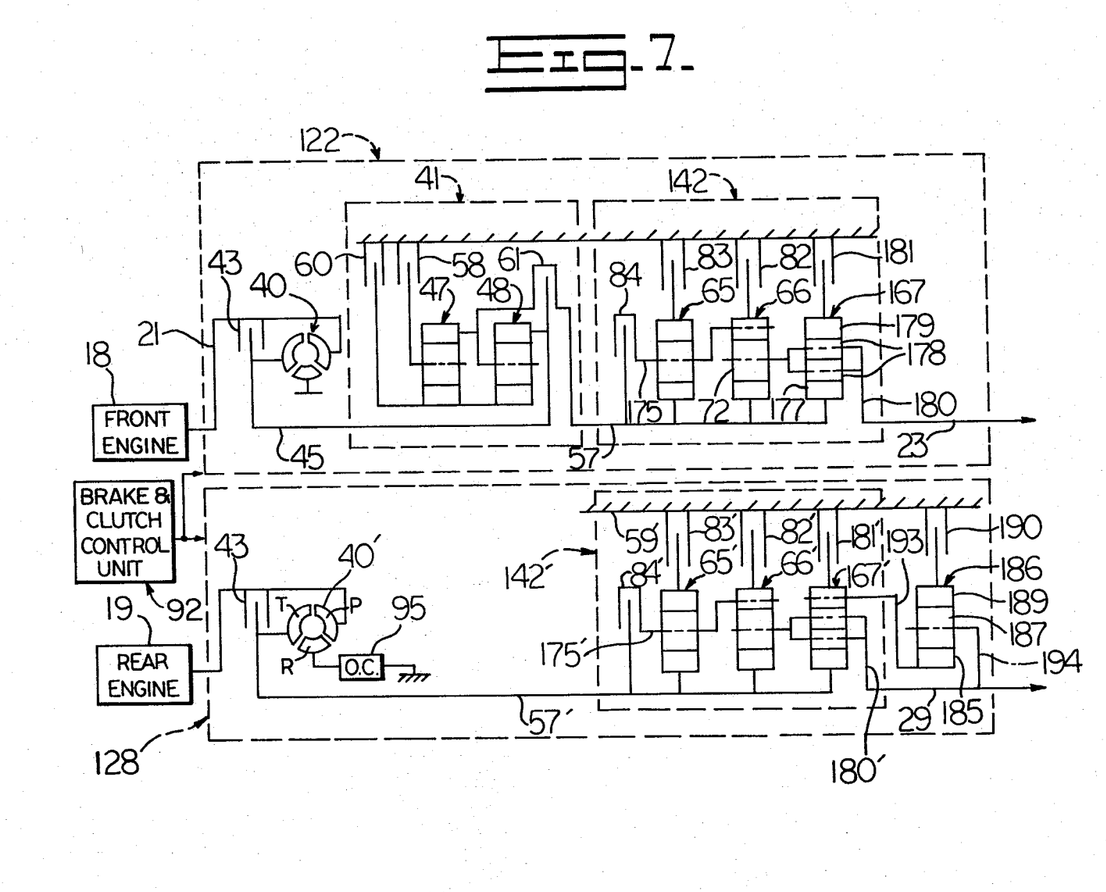
FIG. 7 is a schematic diagram of a modified transmission system.

FIG. 7 shows another modification of the front and rear transmission utilizing the concepts of the present invention. In this modification, the front transmission 122 employs the same torque converter 40, pick up clutch 43 and front gearbox 41, as shown in the previously described front transmission 22.

The range unit 142 also utilizes planetary sets 65 and 66 and brakes 82 and 83 and clutch 84, as previously described, but differs in the reverse planetary set. In this instance, the reverse planetary set 167 comprises a sun gear 177 mounted on input shaft 57, double planet gears 178 and ring gear 179. The planet gears 178 are carried on common carrier 180 which also carries the planet gear 72 of planetary set 66, carrier 180 being fixed to the output shaft 23. Carrier 175 is modified from before in that it carries the planet gear of set 65 and the ring gear of set 66 but it does not carry any gear of the reverse set 167 therewith.

The operation of the front transmission 122 in any of its seven forward speeds is exactly as described in connection with transmission 22 of FIG. 2. In reverse speed, brake 181 is engaged to lock ring gear 179 to housing 59. Rotation of input shaft 57 and sun gear 177 therewith will then drive double planet gears 178 around the stationary ring gear 179 so that carrier 180 will deliver torque to output shaft 23 in a direction opposite to the rotation of input shaft 57.

The rear transmission 128 also uses a torque connector 40' with overrunning clutch 95 and pick up clutch 43' in conjunction with range unit 142', range unit 142' being identical with range unit 142 except that a carrier 193 is coupled to the ring gear of the reverse planetary set 167'. The low-low transmission speed is provided by planetary set 186 which comprises a sun gear 185, planet gear 187 and ring gear 189. Sun gear 185 is mounted for rotation coaxially with output shaft 29 and is coupled by carrier 193 to the ring gear of set 167'. Planet gear 187 is mounted on carrier 194 which is connected to the output shaft 29. Brake 190 enables the ring gear 189 to be locked against rotation to housing 59'.

In operation, when the clutch and brake control unit 92 actuates brakes 82 and 58 of the front transmission for the lowest forward vehicle speed, brake 190 will also be actuated. The ring gear of reverse set 167' will be driven at a rate dependent upon the relative rotation between the input and output shafts 57' and 29, and the sun gear 185 of set 186 will be driven at the same rate since it is coupled to the ring gear of set 167'. Since ring gear 189 is held stationary, the rotating sun gear 185 will drive planet gear 187 and carrier 194 so that a high input-to-output speed ratio is achieved.

The clutches and brakes of the front and rear transmissions 122 and 128 will be controlled for the remaining forward speeds of the vehicle in the same manner as previously described, with corresponding gear sets of range units 142 and 142' being utilized at the same time, and with pick up clutch 43' being actuated whenever brake 60 is actuated.

When reverse brake 181 of the front range unit is engaged, brake 181' of the rear range unit will also be engaged so that reverse torque is delivered to both front and rear wheels.

We claim:
1. In a transmission system;
   a range unit having input and output shafts and a plurality of selectable speed ratios of torque transmission therethrough;
   a hydrodynamic torque converter having a pump, a turbine, an input shaft connected to said pump and an output shaft connected to said turbine, one of said torque converter shafts being connected to one of said range unit shafts;
   clutch means for selectively clutching said input and output shafts of said torque converter together for direct transmission of torque therebetween; and control means for selecting any one of said speed ratios of said range unit and enabling actuation and deactuation of said torque converter clutch means during operation of said range unit in all of the various drive ratios.

2. In a vehicle having a first engine driving first ground-engaging members through a first transmission and a second engine driving second ground-engaging members through a second transmission, the improvement comprising:
  (a) said first transmission including between the input and output thereof a front gearbox in series with a range unit, said front gearbox having two selectable and different speed ratios of torque transmission therethrough, said range unit having a plurality of selectable and different speed ratios of torque transmission therethrough,
  (b) said second transmission including between the input and output thereof a range unit having a plurality of selectable speed ratios of torque transmission therethrough, a hydrodynamic torque converter connected serially with said range unit, and means for selectively enabling said torque converter to transmit torque therethrough or for bypassing said torque converter to transmit torque directly therearound,
  (c) control means for
    (1) simultaneously selecting corresponding speed ratios of torque transmission of said first and second transmission range units,
    (2) selecting one or the other of the speed ratios of torque transmission through said front gearbox, and
    (3) enabling said torque converter of said second transmission to transmit torque therethrough when one of the speeds of torque transmission through said front gearbox has been selected and for bypassing said torque converter when the other of the speed ratios of torque transmission through said front gearbox has been selected.

3. The improvement as set forth in claim 2, the improvement further comprising that the range units of said first and second transmission are identical.

4. The improvement as set forth in claim 3, the improvement further comprising that each of said range units has three forward speed ratios.

5. The improvement as set forth in claim 4, the improvement further comprising that each of said range units has a 1:1 speed ratio and two other different speed ratios wherein the input-to-output speed ratio is greater than one.

6. The improvement as set forth in claim 4, the improvement further comprising that each of said range units includes a selectable speed ratio of reverse torque transmission therethrough.

7. The improvement as set forth in claim 5, the improvement further comprising that the input-to-output speed ratio of said one speed ratio of said front gearbox is greater than one, and that the input-to-output speed ratio of said other speed ratio is 1:1.

8. The improvement as set forth in claim 2, the improvement further comprising that said hydrodynamic torque converter comprises a pump, a turbine and reactor blades and further including a stationary frame and an overrunning clutch connecting said reactor blades to said frame.

9. The improvement as set forth in claim 7, the improvement further comprising that said front gearbox has a third selectable speed ratio wherein the ratio of input-to-output speed is greater than said one speed ratio thereof, the improvement further including:
  a hydrodynamic torque converter connected serially in said first transmission,
  means for selectively enabling said first transmission torque converter to transmit torque therethrough or for bypassing said torque converter to transmit torque directly therearound,
  means coupled to said range unit of said second transmission for producing a selectable fourth and greater input-to-output speed ratio therefrom,
  said control means (c) being further operable to simultaneously select said third speed ratio of said front gearbox and said fourth speed ratio of said second transmission, and being further operable to enable said first transmission torque converter to transmit torque therethrough below a predetermined speed and to bypass said torque converter above said predetermined speed.

10. The improvement as set forth in claim 2 wherein each of said range units comprises:
  a housing;
  input and output shafts journaled in said housing;
  first and second planetary sets each having a sun gear, a planet gear and a ring gear, the sun gears of each set being fixed to said input shaft;
  a first carrier connected to said output shaft and carrying the planet gear of said first set therewith;
  a second carrier coupled to the ring gear of said first set and carrying the planet gear of said second set therewith;
  first brake means for selectively holding the ring gear of said first set against movement relative to said housing;
  second brake means for selectively holding the ring gear of said second set against movement relative to said housing;
  clutch means for selectively clutching said second carrier to said input shaft; and
  the gear ratios of the first and second planetary sets of one range unit being equal to the gear ratios of the first and second planetary sets, respectively, of the other range unit.

11. The improvement as set forth in claim 10 wherein each of said range units further includes:
  a third planetary set having a sun gear, a double planet gear and ring gear, said sun gear being fixed to said input shaft, said double planet gear being carried by said first carrier along with said planet gear of said first set;
  third brake means for selectively holding the ring gear of said third set against movement relative to said housing; and
  the gear ratio of said planetary set of one range unit being equal to the gear ratio of the third planetary set of the other range unit.

12. The improvement as set forth in claim 11 wherein said rear transmission includes:
  a fourth planetary set having a sun gear, a planet gear and a ring gear;
  a third carrier coupling said sun gear of said fourth set and said ring gear of said third set;
  a fourth carrier connected to said output shaft and carrying the planet gear of said fourth set therewith; and fourth brake means for selectively holding the ring gear of said fourth set against movement relative to said housing.

13. The improvement as set forth in claim 12 wherein said hydrodynamic torque converter comprises a pump, a turbine and reactor blades, and further includes an overrunning clutch connecting said reactor blades to said housing of said second range unit.

14. The improvement as set forth in claim 10 wherein each of said range units further includes:
a third planetary set having a sun gear, a planet gear and a ring gear, said sun gear being coupled to said ring gear of said first set;
a third carrier connected to said output shaft and carrying the planet gear of said third set therewith;
third brake means for selectively holding the ring gear of said third set against movement relative to said housing; and
the gear ratio of said third planetary set of one range unit being equal to the gear ratio of the third planetary set of the other range unit.

15. The improvement as set forth in claim 14 wherein said rear transmission includes a fourth planetary set having a sun gear, a double planet gear and a ring gear, said fourth set sun gear being coupled to said ring gear of said first set, said fourth set double planet gear being carried by said third carrier and fourth brake means for selectively clutching the ring gear of said fourth set against movement relative to said housing.

16. The improvement as set forth in claim 15 wherein said hydrodynamic torque converter comprises a pump, a turbine and reactor blades, and further including an overrunning clutch connecting said reactor blades to said housing of said second range unit.

17. A range unit comprising:
a housing;
coaxial input and output shafts journaled in said housing;
a first planetary set having a sun gear, a double planet gear and a ring gear;
second and third planetary sets each having a sun gear fixed to said input shaft, a planet gear and a ring gear;
a first carrier connected to said output shaft and carrying said second set planet gear therewith;
a second carrier coupled to said first set sun gear and said second set ring gear and carrying said third set planet gear therewith;
a third carrier connected to said output shaft and carrying said first set double planet gear therewith;
first, second and third brake means for selectively and respectively holding said first set ring gear, said second set ring gear and said third set ring gear against movement relative to said housing; and
clutch means for selectively clutching said second carrier to said input shaft.

18. A range unit as set forth in claim 17 and further including:
a fourth planetary set having a sun gear, a planet gear and a ring gear, said fourth set sun gear being coupled to said second carrier, said fourth set planet gear being carried by said third carrier; and
fourth brake means for selectively holding said fourth set ring gear against movement relative to said housing.

19. A range unit comprising:
a housing having input and output shafts;
first, second and third planetary sets each having a sun gear, a planet gear and a ring gear, the sun gears of said second and third sets being fixed to said input shaft;
a fourth planetary set having a sun gear fixed to said input shaft, a double planetary gear and a ring gear;
a first carrier connected to said output shaft and carrying said planet gear of said first set therewith;
a second carrier connected to said output shaft and carrying said double planet gear of said fourth set and said planet gear of said second set therewith;
a third carrier coupled to said sun gear of said first set and to said ring gear of said fourth set;
a fourth carrier coupled to said ring gear of said second set and carrying said planet gear of said third set therewith;
first, second, third and fourth brake means for selectively and respectively clutching said ring gears of said first, second, third and fourth sets against movement relative to said housing; and
clutch means for selectively clutching said fourth carrier to said input shaft.

20. In a transmission system:
a range unit housing;
coaxial input and output shafts journaled in said housing;
a first planetary set having a sun gear, a double planet gear and a ring gear;
second and third planetary sets each having a sun gear fixed to said input shaft, and a planet gear and a ring gear;
a first carrier connected to said output shaft and carrying said second set planet gear therewith;
a second carrier coupled to said first set sun gear and said second set ring gear and carrying said third set planet gear therewith;
a third carrier connected to said output shaft and carrying said first set double planet gear therewith;
first, second and third brake means for selectively and respectively holding said first set ring gear, said second set ring gear and said third set ring gear against movement relative to said housing;
first clutch means for selectively clutching said second carrier to said input shaft;
a hydrodynamic torque converter having a pump and a turbine, an input shaft connected to said pump and an output shaft connected to said turbine, one of said torque converter shafts being connected to one of said range unit shafts; and
second clutch means for selectively clutching said input and output shafts of said torque converter together for direct mechanical drive therebetween.

21. In a transmission as set forth in claim 20, wherein said torque converter includes reactor blades and further including an overrunning clutch connecting said reactor blades to said housing.

22. In a transmission system as set forth in claim 20 and further including control means for actuating said first, second and third brake means and said first clutch means one at a time, and for actuating and deactuating said second clutch means during actuation of any of said second and third brake means and said first clutch means.

23. In a transmission system:
a range unit housing having input and output shafts;
first, second and third planetary sets each having a sun gear, a planet gear and a ring gear, the sun gears of said second and third sets being fixed to said input shaft;

a fourth planetary set having a sun gear fixed to said input shaft, a double planetary gear and a ring gear;

a first carrier connected to said output shaft and carrying said planet gear of said first set therewith;

a second carrier connected to said output shaft and carrying said double planet gear of said fourth set and said planet gear of said second set therewith;

a third carrier coupled to said sun gear of said first set and to said ring gear of said fourth set;

a fourth carrier coupled to said ring gear of said second set and carrying said planet gear of said third set therewith;

first, second, third and fourth brake means for selectively and respectively clutching said ring gears of said first, second, third and fourth sets against movement relative to said housing;

first clutch means for selectively clutching said fourth carrier to said input shaft;

a hydrodynamic torque converter having a pump and a turbine, an input shaft connected to said pump and an output shaft connected to said turbine, one of said torque converter shafts being connected to one of said range unit shafts; and second clutch means for selectively clutching said input and output shafts of said torque converter together for direct mechanical drive therebetween.

24. In a transmission as set forth in claim 23, wherein said torque converter includes reactor blades and further includes an overrunning clutch connecting said reactor blades to said housing.

25. In a transmission system as set forth in claim 23 and further including control means for actuating said first, second, third and fourth brake means and said first clutch means one at a time, and for actuating and deactuating said second clutch means during actuation of any of said second and third brake means and said first clutch means.

26. The method of operating a vehicle having a first engine driving first ground-engaging members through a first transmission and a second engine driving second ground-engaging members through a second and separate transmission, in which both first and second transmissions include a range unit therein, each range unit having a plurality of different input-to-output speed ratios, the speed ratios of one range unit being the same as the speed ratios of the other range unit, in which the first transmission range is connected in series with a front gearbox having a low, intermediate and a 1:1 input-to-output speed ratio and in which second transmission range unit is connectable to the second engine either directly or through a hydrodynamic torque converter, the method comprising:

varying the speed ratios of torque transmission through said range units while maintaining said speed ratios equal to each other;

varying the speed ratio of torque transmission through said front gearbox;

transmitting torque from said second engine through said torque converter to said second range unit whenever torque is being transmitted through said front gearbox at its low or intermediate speed ratio; and transmitting torque from said second engine directly to said second range unit whenever torque is being transmitted through said front gearbox at its 1:1 speed ratio.

27. The method of operating a vehicle as set forth in claim 26 and further including transmitting less torque from said second engine to said second transmission than from said first engine to said first transmission.

28. The method of operating a vehicle as set forth in claim 27 and further including transmitting torque from said second transmission to the rear set of ground-engaging members of the vehicle.

* * * * *